Patented Nov. 30, 1943

2,335,505

UNITED STATES PATENT OFFICE 2,335,505

TYPOGRAPHIC PRINTING INK VEHICLE AND METHOD OF PREPARING

Albert E. Gessler, New York, N. Y., assignor to Interchemical Corporation, New York, N. Y., a corporation of Ohio No Drawing. Application November 21, 1939, Serial No. 305,452

7 Claims. (Cl. 106—20)

This invention relates to typographic printing inks, and has particular reference to vehicles for such inks, and to methods of making such vehicles. In particular, it relates to vehicles for such inks comprising alkali metal silicates dissolved in mixtures of water with water-miscible organic solvents which are substantially non-volatile at normal room temperatures.

Water-soluble alkali metal silicates have been suggested heretofore as vehicles for typographic printing inks, but have never been used commercially because of their lack of stability on the press. It has been proposed to improve these inks by the incorporation of small percentages of glycerol and other polyhydric alcohols, sugars and the like; but even these additions have failed to solve the problem of drying on the press.

I have discovered that alkali silicate inks which are remarkably stable under all press room conditions can be made by using as the vehicle of the ink an alkali silicate solution which contains at least 50% of a polyhydric alcohol, preferably glycerol, and preferably containing 60% or more glycerol. For practically all commercial alkali silicate solutions, vehicles of suitable viscosity for the manufacture of printing inks cannot be attained by mere addition of glycerol to the most concentrated aqueous solutions readily obtainable, and ordinarily I find it necessary to distill water from a mixture of silicate, glycerol and water in order to obtain the desired viscosity of the vehicle.

Because of the low cost of sodium silicate, I prefer to use it, of all the alkali metal silicates, as the base for my inks. With the sodium silicates, the only polyhydric alcohols which may be freely used are those which contain three or more hydroxyl groups, including glycerol, mannitol, sorbitol and the like; the dihydric alcohols, such as ethylene glycol, tend to precipitate the silicate, and should be used in relatively small quantities.

When potassium silicates, and the silicates of the more uncommon alkali metals are used, the glycols may be used more freely, as the tolerance of these silicates for the glycols is considerably higher than that of the sodium silicates.

The silica-alkali oxide ratio determines to a large extent the maximum concentration of stable aqueous solution which can be prepared from any silicate. Thus, a solution of sodium silicate having a $SiO_2$-alkali oxide ratio by weight of 2.0 can be prepared containing 55% of silicate and 45% of water. When such a silicate is mixed with an equal weight of glycerol, the resultant mixture has a body which is heavy enough to produce usable printing inks, and contains 27.5% silicate solids. As the ratio of $SiO_2$-metal oxide increases, the possible concentration of solutions which can be handled decreases, so that the maximum solids fall rapidly to 42% for a 2.8 ratio silicate, 39% for a 3.2 ratio and 31% for a 3.9 ratio. In order to get workable printing body with these vehicles, water must be removed from the mixture of water, glycerol, and commercial silicate.

This removal is preferably done by diluting the aqueous silicate solution with glycerol or other polyhydric alcohol, and then removing the water at a relatively low temperature. This may be done under a vacuum, preferably of the order of 20–30 millimeters of mercury. Water can be removed at normal pressure, but such removal should be carried out with care, so that gelation of the silicate at the surface does not occur due to local removal of water beyond a safe point.

It is also possible to make solutions of the desired concentrations by carefully dissolving a hydrated alkali silicate glass in a mixture of water and glycerol.

Typical examples of my invention are the following:

EXAMPLE I.—*Black ink*

| | Parts |
|---|---|
| Carbon black | 10.00 |
| Bone black | 3.00 |
| Synthetic indigo blue | 5.00 |
| Vultamol (aromatic sulfonic acid ester) | 2.00 |
| Alkali silicate varnish: 20 solids, $1Na_2O.2SiO_2$ 41.2 glycerol 18.8 water | 80.00 |

The silicate varnish is made by mixing 36.7 parts of an aqueous solution of the indicated sodium silicate with 43.3 parts of 95% glycerol.

The resultant ink is thin in body; it has good press-stability except in dry weather. Because of the ready solubility of the silicate, I prefer not to use such a varnish except where the print is coated with a protective film.

By preference, I use silicates having higher silica-alkali oxide ratios, since such silicates (particularly those in which the ratios are 3.2 and higher) are much more water resistant when dried. Such inks are particularly useful in the printing of food wrappers and the like made from paper and other cellulosic sheet material which are to be coated with paraffin wax or some such similar water resistant organic coating material. Where conventional inks require intense heat or days of standing to prepare them for wax coating, prints of these inks can be waxed after only a few hours setting in rolls, and in many cases can be waxed directly. The higher ratios are desirable because the waxed paper is passed through a bath of water to brighten the wax, and the water in this operation does not affect the silicate inks containing higher silica-alkali oxide ratios. With silicates of these higher ratios, at least 60% of glycerol is needed in the varnish to insure press stability.

Typical examples of such inks are the following:

EXAMPLE 2.—*Heavy-bodied silicate varnish*

2300 grams 95% glycerol is added carefully, with stirring, to
1940 grams sodium silicate solution, containing 31.1% silicate with a silica-alkali oxide ratio of 3.9

The mixture is heated to 65° C. in a vacuum of 25 mm., until most of the water distills off, to yield a composition containing—

| | Parts by weight |
|---|---|
| Silicate | 20.4 |
| Glycerol | 74.0 |
| Water | 5.6 |

Viscosity 149 poises at 30° C.

EXAMPLE 3.—*Thin-bodied silicate varnish*

1500 grams 95% glycerol is added to
1000 grams of the same aqueous silicate solution as used in Example 2, and the mixture is treated as in Example 2, to give a thin-bodied varnish containing—

| | Parts by weight |
|---|---|
| Silicate | 16.6 |
| Glycerol | 75.8 |
| Water | 7.6 |

Viscosity—43 poises at 30° C.

Inks may be made from the varnishes of Examples 2 and 3, by dispersing pigment in the varnish in conventional manner, as in the following formulae:

EXAMPLE 4.—*Dark brown ink*

| | Parts by weight |
|---|---|
| Cadmium orange | 15.40 |
| Sodium lithol toner | 6.80 |
| Burnt umber | 3.17 |
| Talc | 3.17 |
| Carbon black | 5.00 |
| Titanium dioxide | 1.81 |
| "Vultamol" (an aromatic ester sulfonate) | .45 |
| Silicate varnish of Example 2 | 42.50 |
| Silicate varnish of Example 3 | 21.70 |

EXAMPLE 5.—*Red ink*

| | Parts by weight |
|---|---|
| Lithol rubine toner | 6.60 |
| Barium lithol toner | 8.80 |
| Silicate varnish of Example 2 | 65.90 |
| Silicate varnish of Example 3 | 18.70 |

EXAMPLE 6.—*Blue ink*

| | Parts by weight |
|---|---|
| Ultramarine blue | 20.70 |
| Indanthrene blue | 12.06 |
| Vultamol | 2.64 |
| Silicate varnish of Example 2 | 34.45 |
| Silicate varnish of Example 3 | 30.15 |

As indicated above, varnishes can also be made from hydrated silicate glass. Typical of this method is—

EXAMPLE 7.—*Varnish from hydrated silicate glass*

| | Parts by weight |
|---|---|
| Hydrated silicate glass, containing 17.5% water, 82.5% sodium silicate—ratio 3.2 | 21.2 |
| 95% glycerol | 73.75 |
| Water | 5.05 |

Viscosity, 13.6 poises at 30° C.

The water and half of the glycerine are placed in a container and the silicate gradually added. During the addition, the mixture is vigorously stirred to prevent lumping. The temperature of the mixture is gradually raised to about 100° C., and the remainder of the glycerine is then added very slowly. Heating is continued until all of the silicate is in solution.

The examples are, of course, merely typical. Substantially any pigment can be used which is not reactive with the vehicle. Care should of course be taken to avoid pigments which are acid in character, as these react with the vehicle, and alkali-sensitive pigments should likewise be avoided.

With certain pigments various surface active agents aid in increasing the dispersibility of the pigment in the varnish. A wide variety of these agents may be used, provided care is taken that they do not react with the silicate.

The silicates shown may be replaced by potassium silicate and other alkali metal silicates, at a considerable increase in expense. Various ratios of silica to alkali oxide may be employed, but as indicated above, we prefer ratios of 3.2 or higher, since such silicates give preferred resistance to water, particularly in the described waxing operation.

The particular method of removing water from silicates is of course applicable to other silicates. By preference, even the most soluble silicates are subjected to such a treatment. The treatment itself may be varied, as indicated above.

Various other changes can be made without departing from the scope of the invention, which is defined in the claims.

I claim:

1. A press-stable typographic printing ink vehicle comprising at least 50% by weight of a water-soluble polyhydric alcohol compatible with the aqueous alkali silicate, the residue of the composition consisting essentially of a minor proportion of water and a major proportion of alkali silicate in sufficient quantity to give a body corresponding to that of ordinary typographic printing ink vehicles.

2. A press-stable typographic printing ink vehicle comprising about 15 to 25% alkali silicate, from at least 50 to about 76% of water-soluble polyhydric alcohol compatible with an aqueous solution of the silicate, the residue of the vehicle being essentially water.

3. A press-stable typographic printing ink vehicle comprising at least 50% by weight of glycerol, the residue consisting essentially of a minor proportion of water, and a major proportion of sodium silicate in sufficient quantity to give a body corresponding to that of ordinary typographic printing ink vehicles.

4. A press-stable typographic printing ink vehicle comprising at least 60% by weight of glycerol, the residue consisting essentially of a minor proportion of water, and a major proportion of sodium silicate having a $SiO_2 \cdot Na_2O$ ratio by weight of at least 3.2 to 1.0 in sufficient quantity to give a body corresponding to that of ordinary typographic printing ink vehicles.

5. A press-stable typographic printing ink comprising a pigment nonreactive with alkali silicates dispersed in the vehicle of claim 4.

6. The method of making a press-stable typographic printing ink vehicle comprising sodium silicate, water and a major portion of glycerol, which comprises admixing glycerol with an aqueous solution of the silicate containing sufficient silicate to produce a vehicle of ordinary typographic printing ink vehicle consistency when the composition contains at least 50% of glycerol, and removing water until there is less water present than silicate and the composition contains at least 50% of glycerol and the vehicle has the consistency of ordinary typographic printing ink vehicles.

7. The method of claim 6, in which the water is removed under reduced pressure.

ALBERT E. GESSLER.